United States Patent
Finkeldey et al.

(10) Patent No.: US 12,352,562 B2
(45) Date of Patent: Jul. 8, 2025

(54) METHOD AND COORDINATE MEASURING MACHINE

(71) Applicant: Klingelnberg GmbH, Hückeswagen (DE)

(72) Inventors: Markus Finkeldey, Hattingen (DE); Jan Merkert, Wipperfürth (DE)

(73) Assignee: KLINGELNBERG GMBH, Hückeswagen (DE)

( * ) Notice: Subject to any disclaimer, the term of this patent is extended or adjusted under 35 U.S.C. 154(b) by 109 days.

(21) Appl. No.: 18/101,402

(22) Filed: Jan. 25, 2023

(65) Prior Publication Data
US 2023/0243642 A1  Aug. 3, 2023

(30) Foreign Application Priority Data
Jan. 28, 2022 (EP) .................................... 22153944

(51) Int. Cl.
*G01B 11/24* (2006.01)
*B23Q 17/20* (2006.01)
(Continued)

(52) U.S. Cl.
CPC .......... *G01B 11/2416* (2013.01); *B23Q 17/20* (2013.01); *B23Q 17/24* (2013.01); *G01B 5/008* (2013.01); *G01B 5/202* (2013.01)

(58) Field of Classification Search
CPC ..... G01B 11/1416; G01B 11/06; G01B 11/24; G01B 11/2433; G01B 5/202; G01B 5/008;
(Continued)

(56) References Cited

U.S. PATENT DOCUMENTS

| 4,769,917 A | 9/1988 | Bertz et al. |
| 8,436,606 B2 * | 5/2013 | Takeuchi ............. G01D 5/2448 324/207.21 |

(Continued)

FOREIGN PATENT DOCUMENTS

| DE | 3616177 A1 | 11/1987 |
| DE | 102016120557 A1 | 5/2018 |

(Continued)

*Primary Examiner* — Hoa Q Pham
(74) *Attorney, Agent, or Firm* — CANTOR COLBURN LLP

(57) ABSTRACT

A method includes the following steps: providing a toothed component on a coordinate measuring machine, wherein the measuring machine has first and second sensors for measuring geometric features of the toothed component, and movement axes for executing a measuring movement for acquiring measured values on the toothed component; first measuring of a geometric feature of the toothed component using the first and/or second sensor. A first relative measuring movement is executed to travel along a first measuring path, wherein one or more first measured values are acquired to determine the geometric feature. The method also includes the step of second measuring of a geometric feature of the toothed component using the first and/or second sensor, wherein a second relative measuring movement is executed to travel along a second measuring path; wherein an evaluation of the second measurement takes place in consideration of an axis position known from the first measurement.

14 Claims, 3 Drawing Sheets

(51) Int. Cl.
*B23Q 17/24* (2006.01)
*G01B 5/008* (2006.01)
*G01B 5/20* (2006.01)

(58) Field of Classification Search
CPC .......... G01B 5/20; G01B 5/166; G01B 5/204;
G01B 7/283; G01B 7/146; B23Q 17/20;
B23Q 17/24; G01M 13/021
USPC ................ 356/601–635; 33/501.7, 520, 503;
324/207.11, 207.21, 207.23, 166, 173;
702/67, 95
See application file for complete search history.

(56) References Cited

U.S. PATENT DOCUMENTS

| | | |
|---|---|---|
| 11,471,990 B2 | 10/2022 | Finkeldey |
| 11,971,324 B2* | 4/2024 | Shi .......................... G01B 5/202 |
| 12,196,603 B2* | 1/2025 | Gorgels ................... G01H 9/00 |
| 2019/0249983 A1* | 8/2019 | Wagaj ..................... G01B 5/008 |
| 2020/0298362 A1* | 9/2020 | Finkeldey .......... G01B 11/2416 |
| 2022/0236142 A1* | 7/2022 | Finkeldey ........... G01M 13/021 |
| 2023/0003574 A1* | 1/2023 | Gorgels .............. G01M 13/021 |

FOREIGN PATENT DOCUMENTS

| | | |
|---|---|---|
| DE | 102019107188 A1 | 9/2020 |
| WO | 2018048872 A1 | 3/2018 |

\* cited by examiner

METHOD AND COORDINATE MEASURING MACHINE

CROSS-REFERENCE TO RELATED APPLICATIONS

The present application claims priority to European patent application 22153944.8, filed on 28 Jan. 2022, the contents of which are herein incorporated by reference in their entirety.

TECHNICAL FIELD

The subjects of the disclosure are a method for measuring a component and a coordinate measuring machine for executing such a method.

BACKGROUND

Gear wheels are often measured tactilely, i.e., by mechanical scanning, on coordinate measuring machines. Tactile measuring methods are very precise but have the disadvantage of a long measuring time. A measuring probe scanning the gearwheel thus has to be threaded into each gap of the gear teeth, brought into contact with the tooth flank to be scanned, and retracted from the gap again after the scanning of the tooth flank. The measuring probe is subsequently threaded into the next tooth gap to be measured and the procedure is repeated.

The performance of sensors measuring solely optically, i.e., contactlessly, for measuring the geometry of gear teeth has greatly improved in recent years. Coordinate measuring machines for measuring gear teeth therefore increasingly have optical sensors, which are used alternatively or additionally to tactile measuring probes. Examples of optical sensors for metrological methods are cameras, systems for laser triangulation, interferometric systems, confocal or confocal chromatic systems, systems for light stripe projection, or focus variation.

If a geometric feature of the toothed component has already been determined by a sensor, a further sensor can be pre-positioned for a further measurement on the basis of the already known measurement data before the further sensor starts the measurement. It is disadvantageous in this case that the pre-positioning requires acceleration and deceleration of the further sensor and/or the toothed component before the actual measurement is executed by renewed starting and thus renewed acceleration of the machine axes.

SUMMARY

Against this background, the present disclosure is based on the technical problem of specifying a method and a coordinate measuring machine which enable more efficient measurement of toothed components.

The technical problem described above is achieved in each case by the independent claims. Further embodiments of the disclosure result from the dependent claims and the following description.

According to a first aspect, the disclosure relates to a method having the following method steps: Providing a toothed component on a coordinate measuring machine, wherein the coordinate measuring machine has a first sensor for measuring geometric features of the toothed component, a second sensor for measuring geometric features of the toothed component, and movement axes for executing a measurement movement for acquiring measured values on the toothed component; first measuring of a geometric feature of the toothed component by means of the first sensor and/or the second sensor, such as a tooth pitch, a flank line of a tooth flank, a profile line of a tooth flank, or the like, wherein a first relative measurement movement is executed to travel along a first measurement path, wherein one or more first measured values are acquired to determine the geometric features; second measuring of a geometric feature of the toothed component by means of the first sensor and/or the second sensor, such as a tooth pitch, a flank line of a tooth flank, a profile line of a tooth flank, or the like, wherein a second relative measuring movement is executed to travel along a second measuring path, wherein second measured values are acquired to determine the geometric feature. The method is distinguished in that an evaluation of the second measurement is carried out in consideration of an axis position known from the first measurement.

Due to the consideration of the axis position in the context of the evaluation, it is possible for a numerically stable and repeatable evaluation of the results to take place, since the measured values can always be evaluated using a comparable evaluation beginning, for example, so that it can be ensured, for example, that the evaluation of the measured values always begins at a tooth head of the measured toothed component.

When reference is made in the present case to an axis position, this is not a measured value acquired on the toothed component in this case, rather a position of machine axes of the coordinate measuring machine.

When reference is made in the present case to a measured value, in this case this is a measured value measured on the toothed component, which is computed from a sensor value of the first or second sensor and from an axis position of the machine axes of the coordinate measuring machine. Such a sensor value can be a measured deflection for a tactile measuring probe, for example, which the measuring probe experiences as a result of a touch of a surface of the toothed component. Such a sensor value can be a measured distance for an optical sensor, for example, which the optical sensor has to a focal point on a surface of the toothed component.

It can be provided that before the second measurement, no pre-positioning of the second sensor relative to the toothed component takes place on the basis of a measured value known from the first measurement. In this way, the number of the acceleration procedures required for the second measurement can be reduced, since pre-positioning and renewed starting does not take place for the measurement, rather only the measuring movement having an acceleration procedure at the beginning of the measurement and a deceleration procedure at the end of the measurement. The acceleration and deceleration of the pre-positioning can therefore be omitted. The measuring procedure can be shortened in this way and the wear of the coordinate measuring machine can be reduced, since fewer axis accelerations are required per measuring procedure.

According to one embodiment of the method, it can be provided that a sequence of the second measured values is determined on the basis of the axis position for the evaluation of the second measurement. For example, a rotational angle of an axis of rotation of the coordinate measuring machine and/or an axis position of a linear axis can be assigned to each measured value, wherein the sequence of the evaluation can take place, for example, according to rising or falling value of the assigned rotational angle and/or according to rising or falling value of the assigned axis position.

Alternatively or additionally, it can be provided that a measured value of the second measured values is defined as the starting point of the evaluation of the second measurement on the basis of the axis position. In particular, for example, a measured value of the second measured values can be selected as the starting point, from which it is known on the basis of the axis position from the first measurement that this measured value lies on a tooth head of the toothed component.

Alternatively or additionally, it can be provided that, in the evaluation on the basis of the axis position, those measured values of the second measured values are ascertained which are not required to determine the geometric feature according to the second measurement. Thus, for example, measured values of a measurement beginning of the second measurement can be not evaluated or discarded or not used as the starting point of the evaluation. In particular, for example, those measured values of the measurement beginning of the second measurement can be not evaluated or discarded or not used as the starting point of the evaluation which do not lie on a tooth head of the toothed component, so that it can be ensured that the evaluation begins with measured values of a tooth head of the toothed component.

It can be provided that in the evaluation, a virtual setting into relation of the measured values of the second measurement relative to the toothed component takes place to determine a suitable starting point for the evaluation. It can be provided that the virtual setting into relation corresponds to a shift and/or a rotation of a coordinate system of the measurement in a starting point of the evaluation and a filtering of the second measured values.

In particular, it can be provided that a virtual setting into relation of the measured values of the second measurement relative to the toothed component carried out in the evaluation takes place, for example, in that one of the second measured values is defined as the starting point of the evaluation of the second measurement which lies on a tooth head of the toothed component and the evaluation takes place, for example, according to rising value of the assigned rotational angle, i.e., with predetermined direction of rotation. The virtual setting into relation therefore enables the evaluation of the measured values of the second measurement to be carried out in an accurately repeatable and reproducible manner and in particular enables a numeric stability of the evaluation to be ensured.

It can be provided that the second measuring path has a length which is greater than a minimum required length for determining the geometric feature to be determined by means of the second measurement. If, for example, a component rotation by 360° is required or measured values have to be acquired over an angle range of 360° to measure a geometric feature to be determined, the second measuring path can have a component rotation of more than 360° or measured values can be acquired over an angle range of more than 360°. In particular, in this way a virtual setting into relation can be enabled in the context of the evaluation, in that measured values which are acquired up to a suitable starting point for the evaluation are acquired but are not used as the starting point of the evaluation.

Alternatively or additionally, it can be provided that the second measuring path has a first path section and a second path section, wherein additional measured values are acquired along the first path section which are not required for determining the geometric feature of the toothed component to be determined by means of the second measurement and wherein along the second path section, those second measured values are acquired which are required for determining the geometric feature of the toothed component.

According to one embodiment of the method, it can be provided that an angle increment and/or path increment are determined from the axis position, which define a distance of the sensor used for the second measurement to a geometric reference variable of the component suitable as the evaluation beginning, such as the above-described tooth head or the like.

It can be provided that the angle increment and/or a path increment is added to a minimum required measuring path for acquiring the geometric feature of the toothed component to be determined by means of the second measurement, in order to define the second measuring path. The minimum required measuring path for acquiring the geometric feature of the toothed component to be determined by means of the second measurement is therefore supplemented or extended in particular by the angle increment and/or path increment, in order to enable virtual setting into relation of the measured values of the second measurement relative to the toothed component in the context of the evaluation.

According to one embodiment of the method, it can be provided that the angle increment and/or the path increment is prefixed to the minimum required measuring path for determining the geometric feature of the toothed component to be determined by means of the second measurement, in order to enable a virtual setting into relation of the measured values of the second measurement relative to the toothed component in the context of the evaluation.

It can be provided that second measured values which have been acquired along the angle increment and/or the path increment are not defined as the starting point of the evaluation and/or are not evaluated to determine the geometric feature of the second measurement.

According to one embodiment of the method, it can be provided that the axis position has an item of information on the relative position and/or orientation of the gearwheel in relation to the sensor used for the second measurement.

It can be provided that the second sensor is an optical sensor.

According to one embodiment of the method, it can be provided that the axis position has an item of information with respect to a relative angular location of an optical axis of the second sensor in relation to a reference point, a reference line, or a reference surface of the toothed component, such as a tooth head, a tooth base, an edge head, a flank line, a profile line, a middle of a tooth head, a middle of a tooth base, a middle of a tooth flank, or the like.

It can be provided that the first sensor is a tactile sensor, such as a measuring probe having ball tip or the like. The tactile sensor can be a switching or a scanning measuring probe.

According to one embodiment of the method, it can be provided that the first measurement is carried out tactilely by means of the tactile sensor and that the second measurement is carried out optically by means of the optical sensor.

It can be provided that the travel along the second measuring path includes a rotation of the toothed component by more than 360° around its own axis relative to the sensor used for the second measurement.

It can be provided that the travel along the second measuring path by the machine axes of the coordinate measuring machine exclusively consists of a component rotation of the component in front of the optical sensor, wherein the optical sensor is stationary during the measurement and is not moved during the measurement.

It can be provided that the travel along the second measuring path by the machine axes of the coordinate measuring machine includes a component rotation of the component in front of the optical sensor, wherein the optical sensor is moved translationally during the measurement.

According to a second aspect, the disclosure relates to a coordinate measuring machine, configured for carrying out a method according to the disclosure. The coordinate measuring machine can solely be a measuring device, which is provided and suitable exclusively for measuring tasks. The coordinate measuring machine can be an integral part of a machine tool, which is configured for cutting machining of toothed components.

BRIEF DESCRIPTION OF THE DRAWINGS

The disclosure is described in more detail hereinafter on the basis of a drawing illustrating exemplary embodiments. In the schematic figures.

DETAILED DESCRIPTION OF THE DRAWINGS

Figure 1:
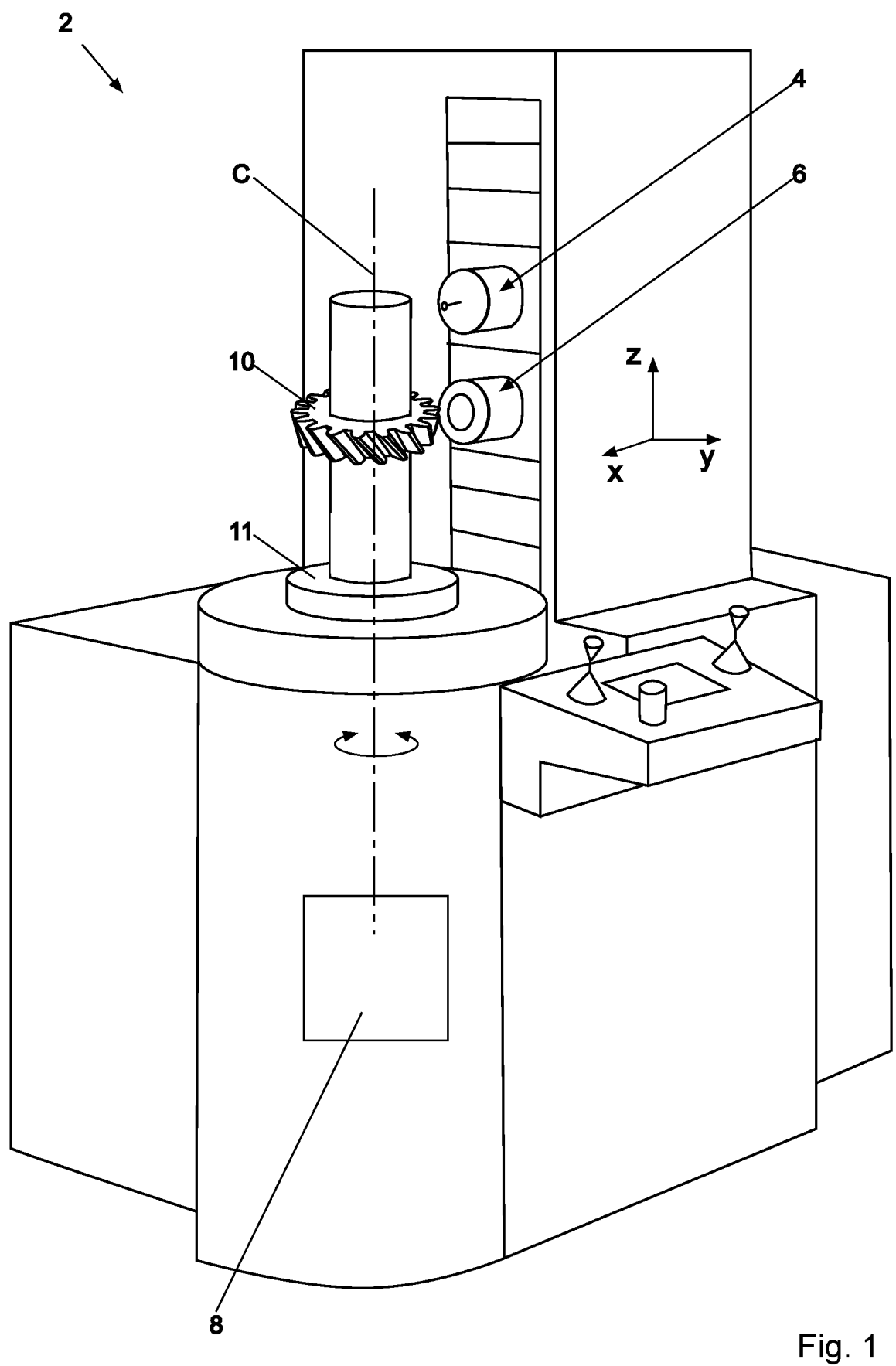
FIG. 1 shows a coordinate measuring machine according to the disclosure.

FIG. 1 shows a coordinate measuring machine 2 according to the disclosure, which is configured for executing a method according to the disclosure. The coordinate measuring machine 2 has a first sensor 4, which is a tactile sensor 4 for measuring gear teeth, in the present case a measuring probe having a ball tip 5. The coordinate measuring machine 2 has a second sensor 6, which is an optical sensor for measuring gear teeth. In the present case, the optical sensor 6 is a confocal chromatic distance sensor.

The coordinate measuring machine 2 has a control and evaluation unit 8, which is configured to control relative measuring movements between the sensors 4, 6 and a toothed component 10 to be measured. The toothed component 10 is a gearwheel in the present case. Furthermore, the control and evaluation unit 8 is used to evaluate the measured values acquired by the sensors 4, 6.

The coordinate measuring machine 2 has a turntable 11, wherein the gearwheel 10 can be rotated by means of the turntable 11 around an axis C. The coordinate measuring machine 2 moreover has linear drives to displace the sensors 4, 6 translationally along the axes of the Cartesian coordinate system x, y, z and execute relative measuring movements in relation to the gearwheel 10.

In a method step (A) of the method according to the disclosure, a provision of the gearwheel 10 on the coordinate measuring machine 2 takes place.

Figure 2:
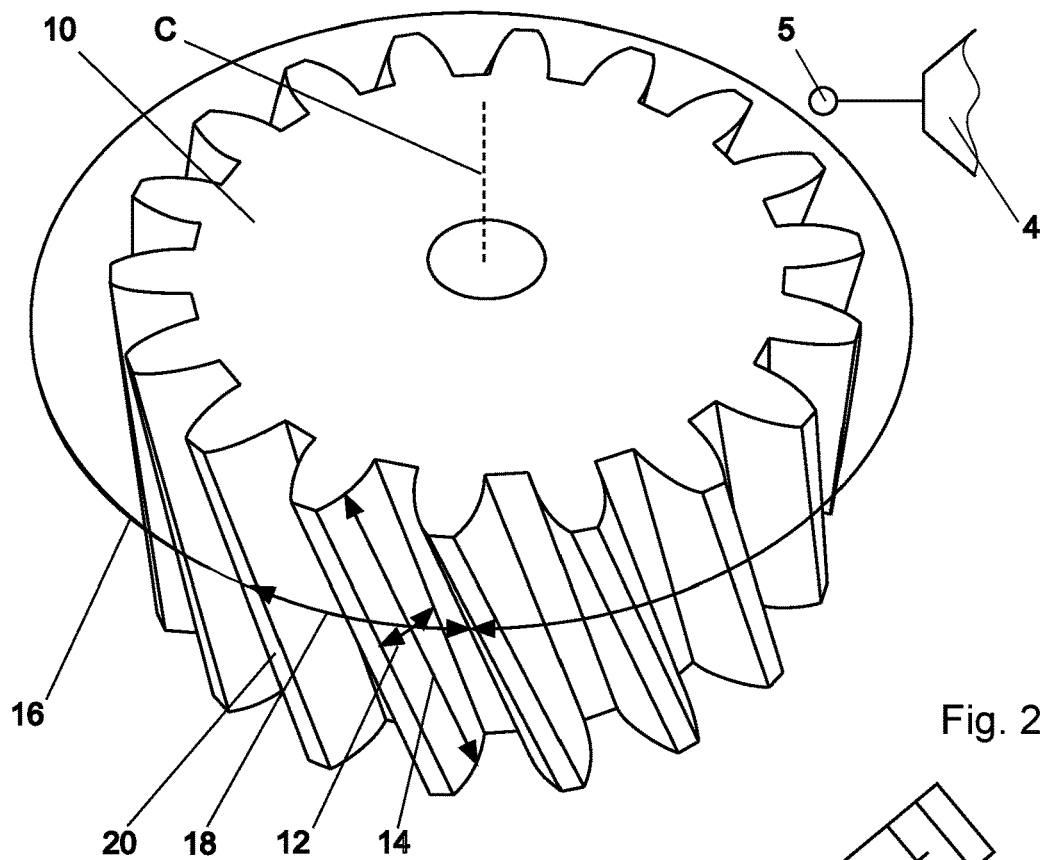
FIG. 2 shows a gearwheel with a tactile measuring system.
Figure 3:
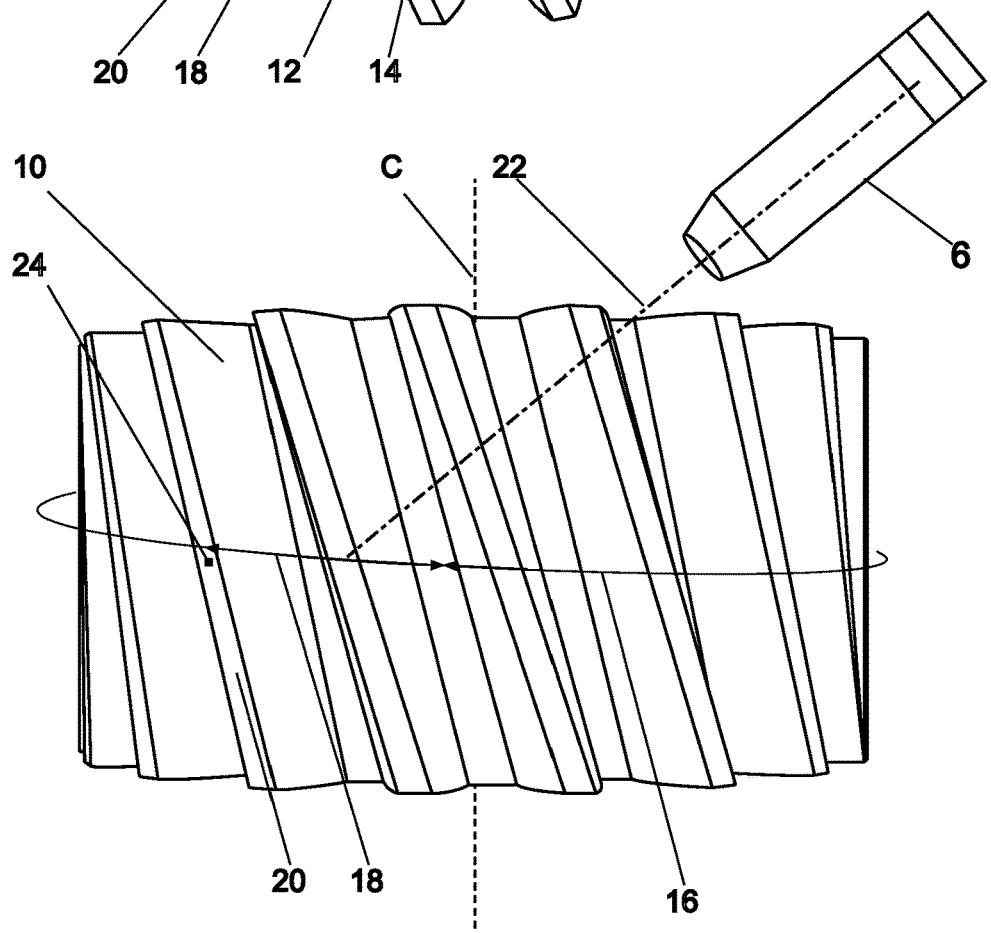
FIG. 3 shows the gearwheel from FIG. 2 with an optical measuring system.
Figure 4:
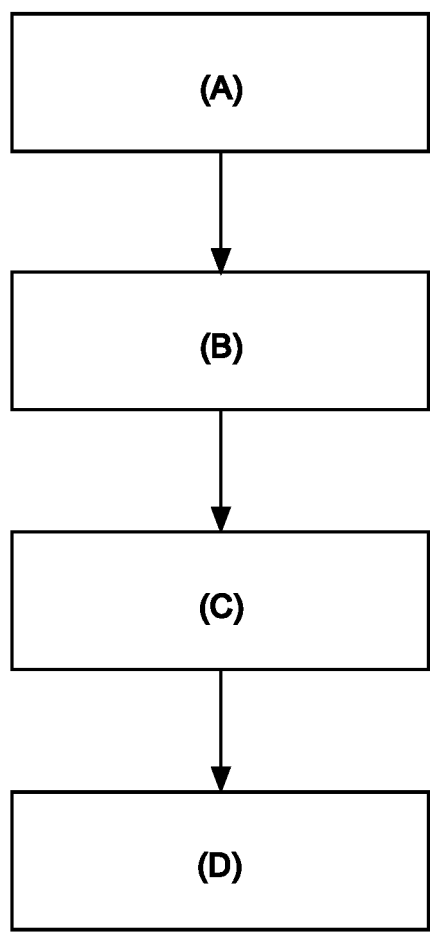
FIG. 4 shows a flow chart of the method according to the disclosure.

In a method step (B), a first measurement of a geometric feature of the gearwheel 10 by means of the first sensor 4 subsequently takes place, as shown by way of example in FIG. 2.

A profile line along a measuring path 12 is measured and/or a flank line along a measuring path 14 is measured here as a geometric feature of the gearwheel 10, for example. The position and orientation of the gearwheel 10 relative to the optical sensor 6 is known by way of the first measurement, since the measured values of the geometry of the gearwheel 10, which are three-dimensional measured values in space, are computed from sensor values of the first sensor 4 and from axis positions of the coordinate measuring machine 2.

In a method step (C), a second measurement of a geometric feature of the toothed component 10 by means of the second sensor 6 then takes place, wherein a second relative measuring movement is executed to travel along a second measuring path 16, wherein second measured values are required to determine the geometric feature.

The second measuring path 16 includes a rotation of the gearwheel 10 by 360° and in addition an angle increment 18, which is prefixed as a supplement to the rotation by 360° of the rotation by 360°.

In a method step (D), an evaluation of the second measurement in consideration of the axis positions known from the first measurement takes place.

In the present case, measured values which have been acquired along the angle increment 18 during the second measurement are not used to evaluate the geometric feature of the gearwheel 2 to be acquired by means of the second measurement.

Before the second measurement, pre-positioning of the second sensor 6 relative to the toothed component 10 on the basis of a measured value from the first measurement has not taken place, rather a virtual setting into relation of the measured values of the second measurement relative to the toothed component 10 is carried out in the evaluation in that measured values which have been measured along the angle increment 18 are not defined as the starting point of the evaluation of the second measurement, rather the first measured value of the second measured values following these measured values of the angle increment 18 is defined as the starting point of the evaluation of the second measurement.

In particular, the evaluation can take place starting from this starting value rising according to the angle of the axis position of the C axis assigned to the measured values.

In this way, it can be ensured that an evaluation of a second measurement for each toothed component 10 always begins at a tooth head 20, for example. The axis position has for this purpose, for example, an item of information on a relative angular location of an optical axis 22 of the second sensor 6 in relation to a center 24 of the tooth head 20, in order to enable the virtual setting into relation or to compute the angle increment 18.

The second measuring path 16 therefore has a length which is greater than a minimal required length for determining the geometric feature to be determined by means of the second measurement, since pre-positioning of the second sensor 6 is omitted.

The invention claimed is:

1. A method including the following steps:
providing a toothed component on a coordinate measuring machine, wherein the coordinate measuring machine has a first sensor for measuring geometric features of the toothed component, a second sensor for measuring geometric features of the toothed component, and movement axes for executing a measuring movement for acquiring measured values on the toothed component, first measuring of a geometric feature of the toothed component using the first sensor and/or the second sensor, wherein a first relative measuring movement is executed to travel along a first measuring path, wherein one or more first measured values are acquired to determine the geometric feature, and second measuring of a geometric feature of the toothed component using the first sensor and/or the second sensor, wherein a second relative measuring movement is executed to travel along a second measuring path, wherein second measured values are acquired to determine the geometric feature, wherein an evaluation of the second measurement takes place in consideration of an axis position known from the first measurement, wherein before the second measurement, no pre-positioning of the second sensor relative to the toothed component on the basis of a measured value known from the first measurement takes place.

2. The method as claimed in claim 1, wherein a sequence of the second measured values for the evaluation of the second measurement is determined on the basis of the axis position;

and/or a measured value of the second measured values is defined as the starting point of the evaluation of the second measurement on the basis of the axis position;

and/or measured values of the second measured values, which are not required for determining the geometric feature according to the second measurement, are ascertained in the evaluation on the basis of the axis position;

and/or a virtual setting into relation of the measured values of the second measurement relative to the toothed component takes place in the evaluation.

3. The method as claimed in claim 1, wherein the second measuring path has a length which is greater than a minimum required length for determining the geometric feature to be determined using the second measurement, and/or the second measuring path has a first path section and a second path section, wherein additional measured values are acquired along the first path section, which are not required for determining the geometric feature of the toothed component to be determined using the second measurement and wherein along the second path section, those second measured values are acquired which are required for determining the geometric feature of the toothed component.

4. The method as claimed in claim 1, wherein an angle increment and/or a path increment are determined from the axis position, which define a distance of the sensor used for the second measurement in relation to a geometric reference of the toothed component suitable as an evaluation beginning.

5. The method as claimed in claim 4, wherein the angle increment and/or a path increment is added to a minimum required measuring path for acquiring the geometric feature of the toothed component to be determined using the second measurement, in order to define the second measuring path.

6. The method as claimed in claim 5, wherein the angle increment and/or path increment is prefixed to the minimum required measuring path for determining the geometric feature of the toothed component to be determined using the second measurement.

7. The method as claimed in claim 1, wherein second measured values which have been acquired along the angle increment and/or the path increment are not defined as the starting point of the evaluation and/or are not evaluated to determine the geometric feature of the second measurement.

8. The method as claimed in claim 1, wherein the axis position has an item of information on a relative position and/or orientation of the gearwheel in relation to the first or second sensor carrying out the second measurement.

9. The method as claimed in claim 8, wherein the axis position includes an item of information on a relative angular location of an optical axis of the second sensor in relation to a reference point, a reference line, or a reference surface of the toothed component.

10. The method as claimed in claim 1, wherein the second sensor is an optical sensor.

11. The method as claimed in claim 1, wherein the first sensor is a tactile sensor.

12. The method as claim 11, wherein first measurement is carried out tactilely using the tactile sensor and the second measurement is carried out optically using the optical sensor.

13. The method as claimed in claim 1, wherein the travel along the second measuring path includes a rotation of the toothed component by more than 360° around its own axis relative to the sensor carrying out the second measurement.

14. A coordinate measuring machine, configured for carrying out a method as claimed in claim 1.

* * * * *